OR 3,906,450

United S [11] 3,906,450

Prado, Jr. [45] Sept. 16, 1975

[54] ELECTRONIC SYSTEM FOR THE RECORDING OF PERIODICALLY SAMPLED VARIABLES

[76] Inventor: Eduardo da Silva Prado, Jr., Rua Sao Remigio, No. 30, Sao Paulo, Brazil

[22] Filed: Oct. 24, 1974

[21] Appl. No.: 517,796

Related U.S. Application Data

[63] Continuation of Ser. No. 410,110, Oct. 26, 1973, abandoned, which is a continuation of Ser. No. 187,905, Oct. 8, 1971, abandoned.

[30] Foreign Application Priority Data

Oct. 9, 1970 Brazil .................................. 222937

[52] U.S. Cl. ........ 340/150; 178/DIG. 13; 179/2 AS

[51] Int. Cl.[2] .. H04B 1/00; H04N 1/44; H04M 11/00

[58] Field of Search ........ 340/149 R, 150, 201, 203, 340/146.1 AG; 178/DIG. 13; 179/2 AS; 325/31, 53, 55; 346/34, 37

[56] References Cited

UNITED STATES PATENTS

| | | | |
|---|---|---|---|
| 2,957,046 | 10/1960 | Freeman et al. | 179/2 AS |
| 3,070,798 | 12/1962 | Curry et al. | 179/2 AS |
| 3,225,333 | 12/1965 | Vinal | 340/172.5 |
| 3,384,874 | 5/1968 | Morley et al. | 340/163 |
| 3,397,402 | 8/1968 | Schneider | 346/37 |
| 3,417,916 | 12/1968 | Brockel et al. | 346/34 |
| 3,478,318 | 11/1969 | Rorholt | 340/150 |
| 3,483,327 | 12/1969 | Schwartz | 179/2 AS |
| 3,492,577 | 1/1970 | Reiter et al. | 325/31 |
| 3,532,827 | 10/1970 | Ewin | 179/18 |
| 3,676,878 | 7/1972 | Linder | 340/408 |
| 3,733,430 | 5/1973 | Thompson et al. | 178/DIG. 13 |

*Primary Examiner*—Donald J. Yusko
*Attorney, Agent, or Firm*—Emory L. Groff, Jr.

[57] ABSTRACT

System for transmitting periodically pulsed variable information and forwarding it to a recorder for processing and reproduction, which recorder is activated only when a change occurs from the previously received data. As particularly described herein this system is directed to a television audience analysis, or "rating", by analyzing the periodically pulsed variable information received from the television receivers in the homes.

1 Claim, 9 Drawing Figures

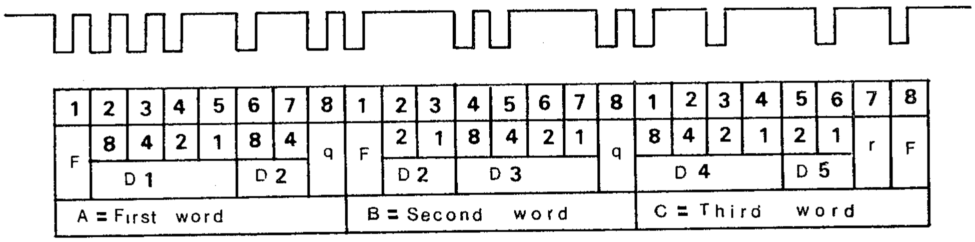

A1=F=Fixed pulse for start of recording.
A2=8D1=Indication of Power Supply.
A3=4D1=
A4=2D1= } Code of the viewed channel: 4 - 2 - 0 = 6 (channel 11)
A5=1D1=
A6=8D2=
A7=4D2= } Code of content of D2 : 8 + 0 = 8 (see B1)
A8= q = Pulse for even parity.
B1=F= Fixed pulse for start of second word.
B2=2D2=
B3=1D2= } Code of content of D2 : 0 + 0 = 0 (D2= 8 minutes)
B4=8D3=
B5=4D3=
B6=2D3= } Code of content of D3 : 8 + 4 + 0 + 0= 12
B7=1D3=
B8= q = Pulse for even parity.
C1=8D4=
C2=4D4=
C3=2D4= } Code of content of D4: 8 + 0 + 2 + 0= 10
C4=1D4=
C5=2D5=
C6=1D5= } Code of content of D5: 0 + 1= 1
C7= r = Pulse for odd parity.
C8= F = Fixed Pulse for end of recording.

The total time count of this sampling is 8 of D2, plus 16 x 12 of D3, plus 256 x 10 of D4, plus 4,096 x 1 of D5, or a total of 6,856 minutes after the start of the control.

FIGURE 4A

Group 1

| | | | | | | | |
|---|---|---|---|---|---|---|---|
| F F F x | F F F x | | 422 1 x | 4 2 1 x | 4 2 1 x | 4 2 1 x | |
| | | | D41 | D42 | D43 | D44 | |

Group 2

| | | | | | | | |
|---|---|---|---|---|---|---|---|
| 4 2 1 x | 4 2 1 x | 4 2 1 x | 4 2 1 x | 4 2 1 x | 4 2 1 x | 4 2 1 x | 4 2 1 x |
| D1 | D2 | D3 | D4 | D5 | D6 | D7 | D8 |

Group 3

| | | | | | | | |
|---|---|---|---|---|---|---|---|
| 4 2 1 x | 4 2 1 x | 4 2 1 x | 4 2 1 x | 4 2 1 x | 4 2 1 x | 4 2 1 x | 4 2 1 x |
| D9 | D10 | D11 | D12 | D13 | D14 | D15 | D16 |

Group 4

| | | | | | | | |
|---|---|---|---|---|---|---|---|
| 4 2 1 x | 4 2 1 x | 4 2 1 x | 4 2 1 x | 4 2 1 x | 4 2 1 x | 4 2 1 x | 4 2 1 x |
| D17 | D18 | D19 | D20 | D21 | D22 | D23 | D24 |

Group 5

| | | | | | | | |
|---|---|---|---|---|---|---|---|
| 4 2 1 x | 4 2 1 x | 4 2 1 x | 4 2 1 x | 4 2 1 x | 4 2 1 x | 4 2 1 x | 4 2 1 x |
| D25 | D26 | D27 | D28 | D29 | D30 | D31 | D32 |

Group6

| | | | | | | | |
|---|---|---|---|---|---|---|---|
| 4 2 1 x | 4 2 1 x | 4 2 1 x | 4 2 1 x | 4 2 1 x | 4 2 1 x | 4 2 1 x | 4 2 1 x |
| D33 | D34 | D35 | D36 | D37 | D38 | D39 | D40 |

Group 7

| | | | | | | | |
|---|---|---|---|---|---|---|---|
| 3216 8 x | 4 2 1 x | 3216 8 x | 4 2 1 x | 3216 8 x | 4 2 1 x | 3216 8 x | 4 2 1 x |
| C 0 | C 0 | C 1 | C 1 | C 2 | C2 | C 3 | C 3 |

Group 8

| | | | | | | | |
|---|---|---|---|---|---|---|---|
| 3216 8 x | 4 2 1 x | 3216 8 x | 4 2 1 x | 3216 8 x | 4 2 1 x | 3216 8 x | 4 2 1 x |
| C 4 | C 4 | C 5 | C 5 | C 6 | C 6 | C 7 | C 7 |

F = Fixed pulse x = Even parity pulse

The registered signal contains 8 Groups of 8 Words of 4 Bits each. Every fourth bit is an even parity pulse.

F I G U R E 8

ELECTRONIC SYSTEM FOR THE RECORDING OF PERIODICALLY SAMPLED VARIABLES

This is a continuation of application Ser. No. 410,110, filed Oct. 26, 1973, which is a continuation of application Ser No. 187,905, filed Oct. 8, 1971, both now abandoned.

The present invention is directed broadly to electronic systems utilized in the recording of periodically sampled variables, containing components and circuits such that the resultant recording of the coded values of the controlled variables, is made as a sequence of binary pulses on magnetic tape, and is ready for the immediate processing in digital electronic computers.

The basic characteristic of this invention is that a recording is made only if there has been a change in the values of the controlled variables during two consecutive samplings of these variables; as a consequence, the recording also contains the code for the time period in which the change has accurred. Each individual recording will therefore contain the coded information, as binary pulses, referring to the time period of the sampling and of the values of the controlled variables.

This basic characteristic of the present invention permits a very great economy in the amount of the recording material, as well as in the time necessary for the subsequent computer processing of the registered data. This reflects itself in a much lower operational cost of this invention as compared with other systems presently in use.

As examples of variables which can be controlled by the system of this invention, we may cite: voltages, currents, pressures, temperatures, positions, weights, or any other which can be transformed into an electrical signal by means of appropriate conventional transducers.

One of the many uses of the system of this invention, is the gathering of data for audience analysis, also called "rating", by means of recording the listening or viewing habits of representative parts of the general public.

For this above mentioned application, a certain number of television receivers, distributed among selected families, will be adapted, without interfering with the normal use of the receivers, to gather the data for the statistical analysis. This adaptation consists of codifying the channels which can be received, and at predetermined time intervals to compare the code of the channel being received at the moment with the code of the channel which was being received in the preceding sampling, this second code having been stored in the memory of the system; if the two codes are equal, then the circuit is not activated and no recording is mede; if, however, the two codes differ, then the memory is up-dated, the circuit is activated and a recording is made of codes of the time of the sampling and of the channel being now received.

This procedure is repeated every time sampling is done and results in a series of recordings indicating the times and the channels being received. It is evident that no needless recordings of the periods of no change of channels is made, neither of the periods when the receiver is turned off.

This application mentioned above in general lines will be further explained in more detail for two executions of the rating or audience analysis: the first execution regards the control and recording at the residence being sampled, and the second execution regards the central control and recording station linked to many sampled residences.

The description which follows will refer to the annexed drawings, in which:

FIG. 4A shows an example of the pulses in a typical recording, with the meaning of each pulse.

FIG. 8 shows the general form of the recorded pulses with the meaning of their respective codes.

Figure 1:
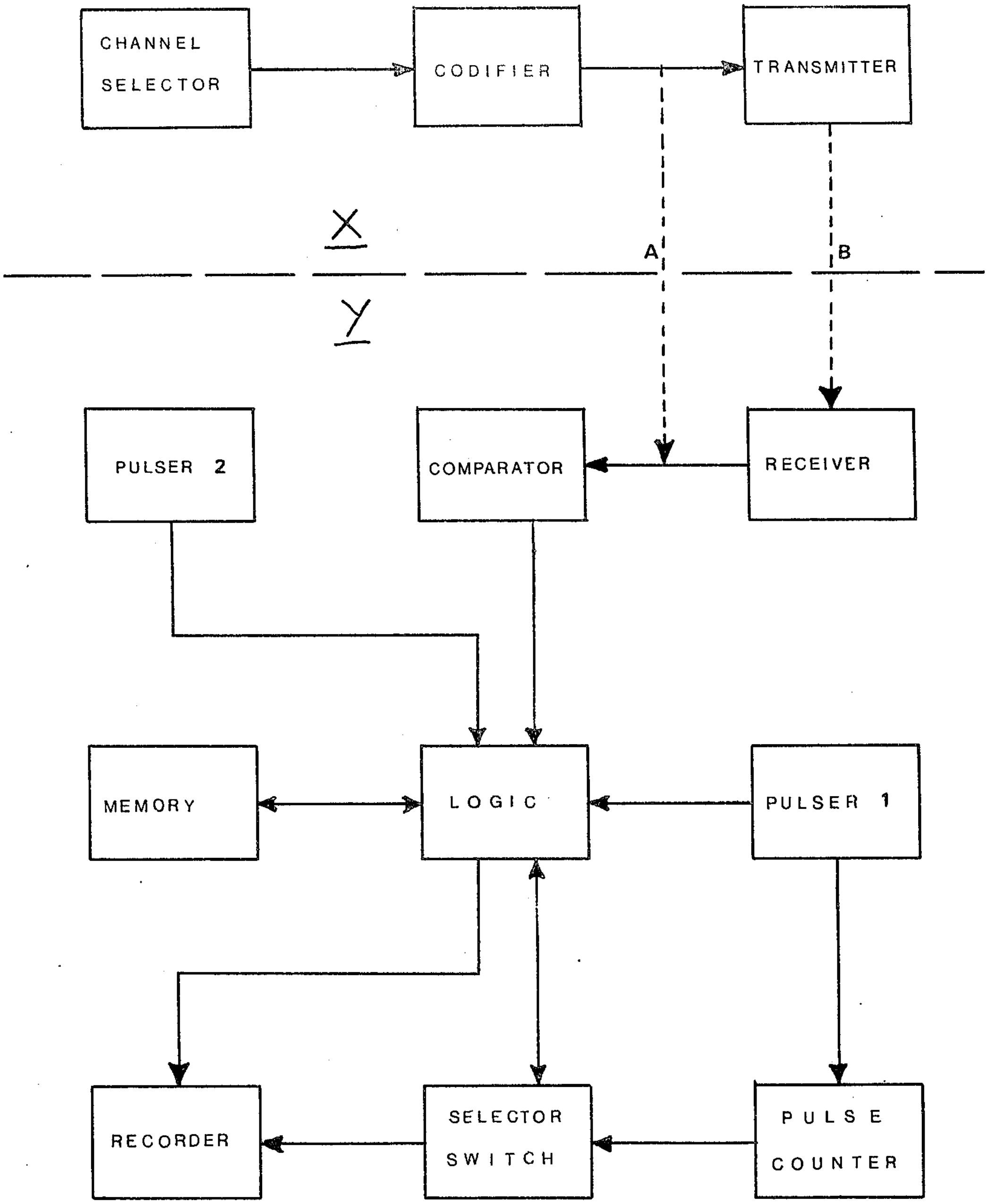
FIG. 1 shows a block diagram of this invention in the first mentioned execution.

Referring now to FIG. 1, we see in the upper part, marked X, a codifier connected to the channel selector of the television receiver. This codifier converts the different positions of the selector to a binary coded signal A which may be transmitted directly to the comparator, or be utilized as the modulating signal for the transmittor/receiver link. This transmitter/receiver link may be of any type, audio, "carrier", high-frequency, laser, or any other, with the only requirement that the signal A is again present at the input of the comparator.

In the Y part of FIG. 1, we see a pulser 1 which provides the time pulse for the sampling of the signal A; these time pulses are also counted by the pulse counter. When the time pulse arrives at the logic, the comparator is activated and the coded signal A is compared with the one stored in the memory; if they are equal, the logic deactivates the comparator and the circuit returns to the initial state; no recording is made, only another time pulse is counted.

If, when the time pulse activates the comparator, the coded signal A is found to be different from the one stored in the memory, the recorder is turned on, and through the logic the memory is up-dated to the new coded signal, the comparator is then deactivated and the selector-switch initiates the sequence of binary pulses which are recorded; the recorded sequence of pulses contain the information of the channel being tuned plus the time of the sampling. At the end of the recording, the recorder is turned off and the circuit returns to the initial state.

It is clear from the above description that a recording is made only if there has been a difference in the coded signal A between two consecutive samplings; no recordings are made during the periods when there is no change in the setting of the channel selector of the television receiver, nor during the periods when the television receiver is turned off.

For a more detailed explanation of this particular application of the present invention, we will consider a weekly period of control of each adapted receiver, with a sampling time of once every minute. There are 10,080 minutes in a week; the other systems presently in use make recordings at every sampling and need therefore to make all the more than 10,000 recordings during this one week period. With the system of this invention, only the actual changes are recorded, which at an average of 15 per hour during 6 viewing hours per day would require only 630 recordings.

The economy of recording material, and the subsequent processing of the acquired data, is more than evident.

The sampling frequency could be increased to e.g. once every 5 seconds, with as result a finer rating analysis, with only a relatively small increase in the number of recordings, due to the basic particularity of this invention; being on the other hand a formidable task for the other systems at present in use, since they would have to make more than 120,000 recordings.

The situation of the city of Sao Paulo; Brazil was considered for the building of the prototype. The seven VHF television stations, channels 2, 4, 5, 7, 9, 11 and 13, have been assigned the respective binary codes of 001, 010, 011, 100, 101, 110 and 111, the code 000 being utilized to signify the condition of the television receiver being turned off.

Figure 2:
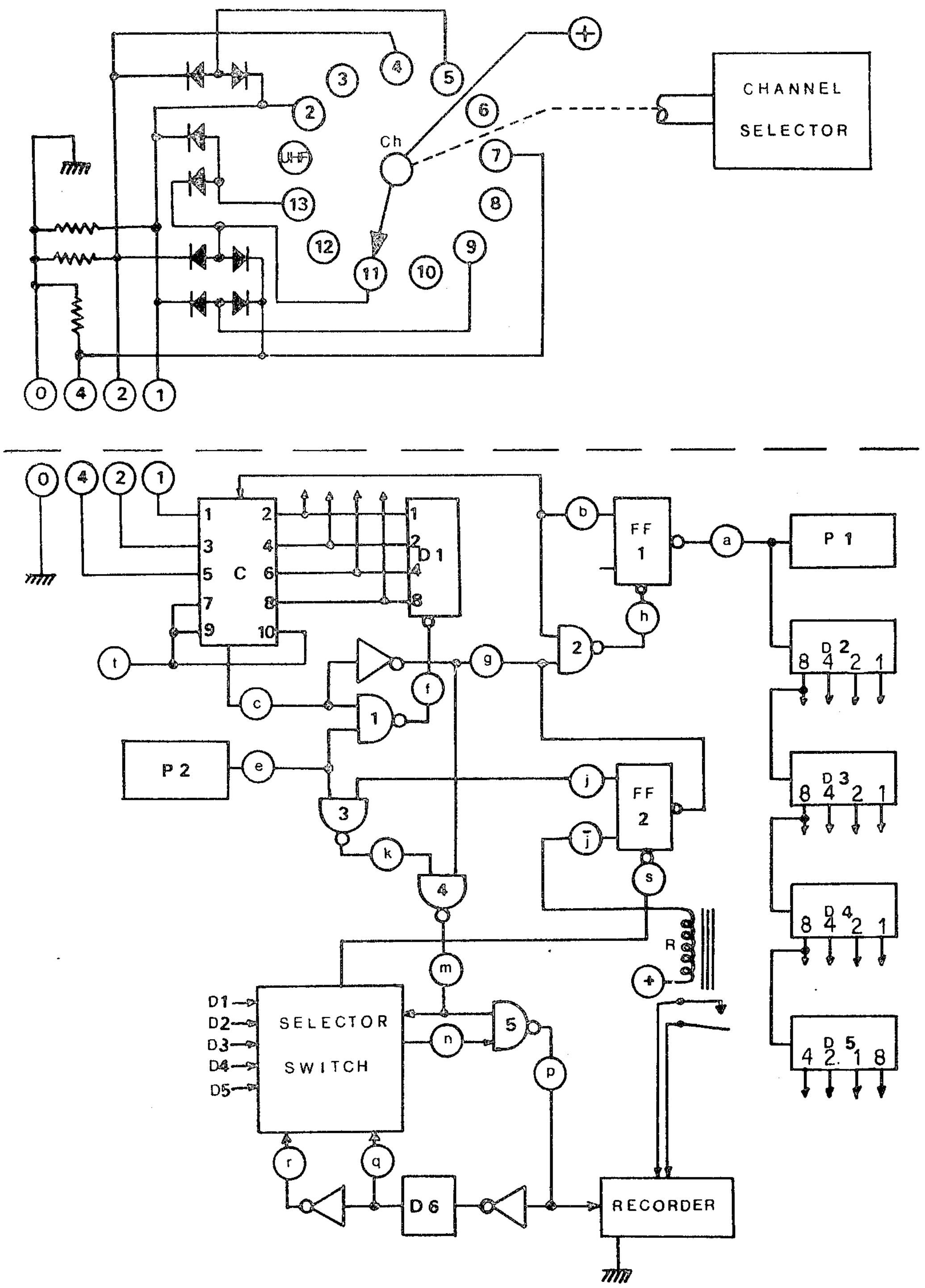
FIG. 2 shows the schematic circuit diagram of this execution.

Referring to FIG. 2, we see in the upper part marked X a thirteen position switch coupled directly to the channel selector, plus a diode array, which together with the switch Ch constitutes the codifier. By utilizing a convenient positive voltage of the television receiver, we obtain at the lines 1, 2 and 4 the coded signals which represent the station being tuned in; the 0 line is the common line. In the example shown, channel 11 is being watched; therefore, its code 110 appears at the lines. Lines 4 and 2 are positive and line 1 has no voltage; they are respectively H (High) and L (Low). We will use the notation H and L for the respective High or positive and Low or no voltage further in this description.

In the Y portion of FIG. 2, we find the pulser *p*1 which is a battery driven clock with the necessary dividers and produces the once per minute timing pulses at point *a*. These pulses *a* are counted by the dividers D2 up to D5. At the arrival of this L pulse at *a*, the flip-flop FFI is inverted and point *b* goes H and activates the comparator C; at the 1, 3 and 5 inputs of C we have the coded signals of the codifier (we have in this prototype used the direct connection for simplicity sake); at the inputs 2, 4, 6 and 8 we have the output of the memory D1; at the inputs 7, 9 and 10 we have the signal *t* which we will consider H for the moment. The comparator verifies if the signals at its paired inputs are the same; if at any pair a difference exists, the output *c* of the comparator will be H. Considering that, e.g., we had in the memory the code 1010 corresponding to channel 4, the output *c* will be H and gate 1 opens to pass the pulses *e* from pulser 2 as *f* which feeds the memory D1; with *c* being H, *g* goes L and the flip-flop FF2 is switched making *j* go H, the recorder is turned on by the relay R, gate 3 opens and the pulses *e* pass as *k* to gate 4. To up-date the memory D1 from code 1010 to code 1110 we need four *f* pulses; at this moment all the paired inputs of the comparator are equal and its output *c* goes L closing gate 1, preventing further changes in the memory, and making *g* go H which combined with *b* which is still H in gate 2, forms a L pulse at *h* which resets the flip-flop FF1 deactivating the comparator. At the moment *g* goes H, the gate 4 opens and the *k* pulses pass as *m* to feed the selector-switch and gate 5. The output *n* of the selector-switch is combined with the *m* pulses in gate 5 to form the *p* pulses which are used for the recording. The *p* pulses are inverted and divided by two in divider D6 to make the *g* pulses which are used in gates 12 and 20 as even parity pulses, *g* is inverted to *r* used as odd parity pulse for gate 27.

At the thirty-second pulse *m* the dividers of the selector-switch are forced to reset to zero and a L pulse appears at *s* to reset the flip-flop FF2; the recorder is turned off and the circuit is again in its initial state and awaits for the next sampling pulse *a*.

If no changes in the setting of the television receiver have occurred at the arrival of the next *a* pulse, when the comparator is activated, its output *c* remains L, gate 1 remains closed, FF2 is not inverted, the recorder is not turned on, and since *g* is H, FF1 is reset to the initial state. The only thing that happens is the count of the sampling pulse.

when the television receiver is turned off, a recording with the code 1000 will be made at the sampling time to indicate this condition. No further recordings will be made until the television receiver is again turned on.

When there is a power supply failure, obviously the television receiver will signal the 000 code, but the point *t* will also be L; therefore, a recording will be made with the 0000 code. Evidently no further recordings will be made until the power supply is re-established, when a recording of the code of the still tuned in channel will be made or the 1000 code representing the turned off condition of the television receiver.

Figure 3:
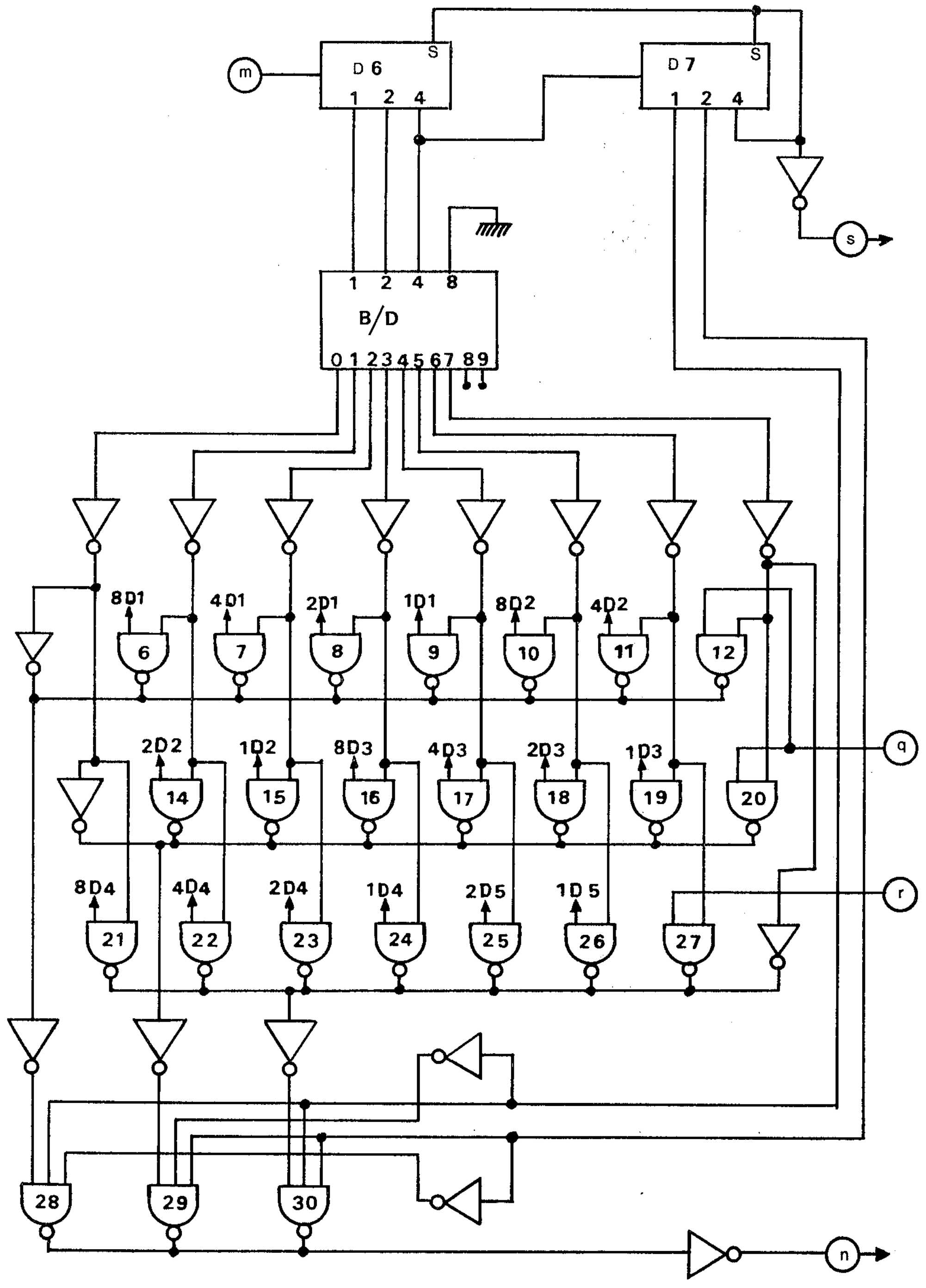
FIG. 3 shows the schematic circuit diagram of the selector switch utilized in FIGS. 1 and 2.

In FIG. 3, we see the circuit of the selector-switch utilized in FIGS. 1 and 2, where the *m* pulses are divided two times by eight in dividers D6 and D7.

D6 is connected to a binary/decimal converter B/D where the input 8 is always L; as soon as the *m* pulses start we will obtain at the decimal outputs, zero through seven, sequentially a L pulse, through inverters the corresponding H pulses command the gates 6 through 27. Since this cycling repeats itself four times, the gates 28, 29 and 30 select the appropriate eight bit word for the output *n;* these gates are commanded by the combination of the 1 and 2 outputs of the divider D7. The first word period, when both 1 and 2 of D7 are L is a waiting period during which the recorder motor has time to reach its normal speed; the following three periods command the gates 28, 29 and 30; on the thirty-second *m* pulse the output 4 of D7 goes H and resets both dividers and the L pulse at *s* resets also FF2, the recorder is turned off.

Figure 4:
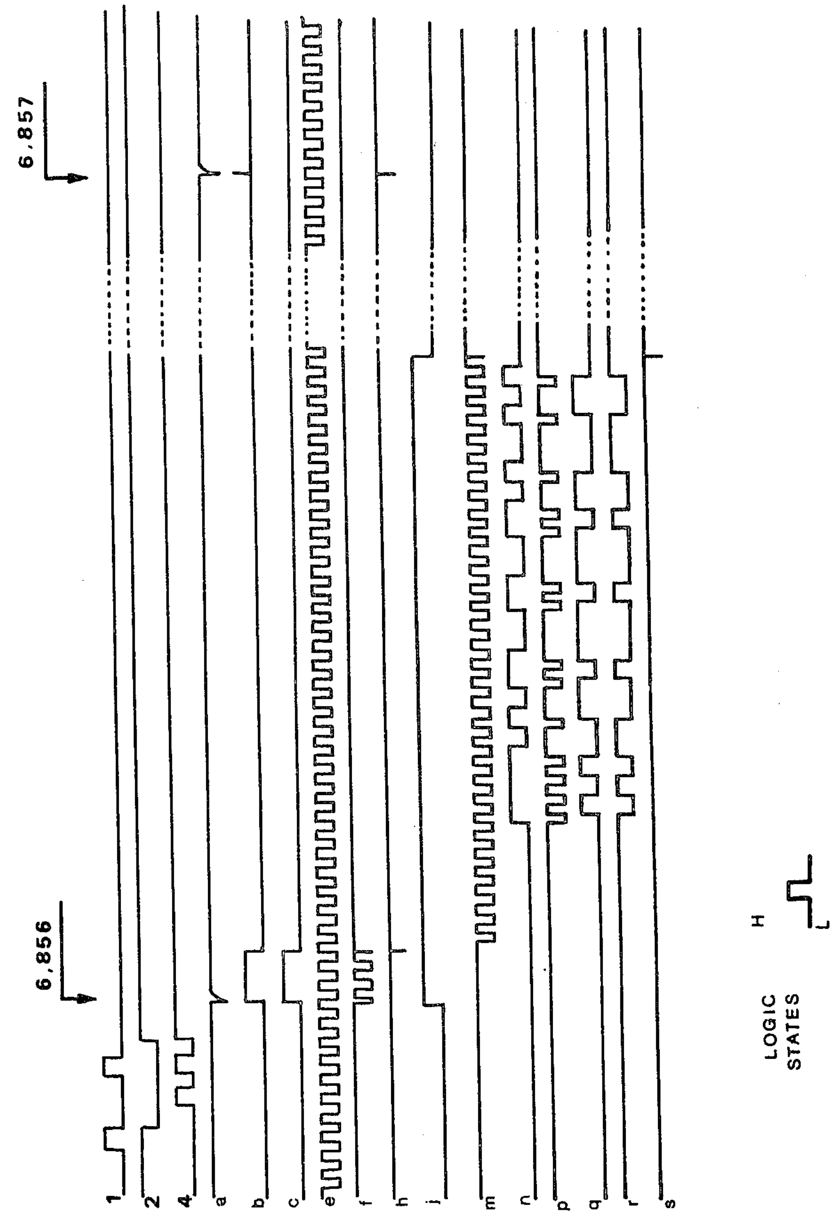
FIG. 4 shows a graphic representation of the logic states occurring at the various points of the circuit.

In FIG. 4 the logic states of the various points of the circuit are shown. The example considers that the channel tuned changes from channel 4 to channel 11 just before the sampling pulse number 6,856.

This example considers also the logic changes at the sampling pulse number 6,857 when there has been no change in the tuned channel.

In FIG. 4A, the series of pulses recorded in the example considered in FIG. 4 is shown.

The even and odd parity pulses insure that each eight bit word recorded contains always an even number of pulses.

Although only nine coding signals are being used, seven for the considered television channels plus one for the off and one for the power shortage conditions, all 16 possibilities of the memory D1 could be used, for UHF channels or even other uses as video recording play-back.

In the second practical execution of this invention, centralizing the control and recording of the remotely sampled residences, we shall have at the selected residences only the installation of the codifiers and the code transmitters, the rest of the system being centralized at one or more control and recording centers.

In view of the importance of this application, we shall consider in greater detail one of the many possible executions.

The example chosen will consider a central unit controlling forty sampled residences by means of private telephone lines, for the same seven VHF channels as in the example of the first execution. Evidently, the number of sampled residences, the number of channels controlled, the transmitter receiver link, etc. could have been any other with the simple adaptation of the circuits.

Figure 5:
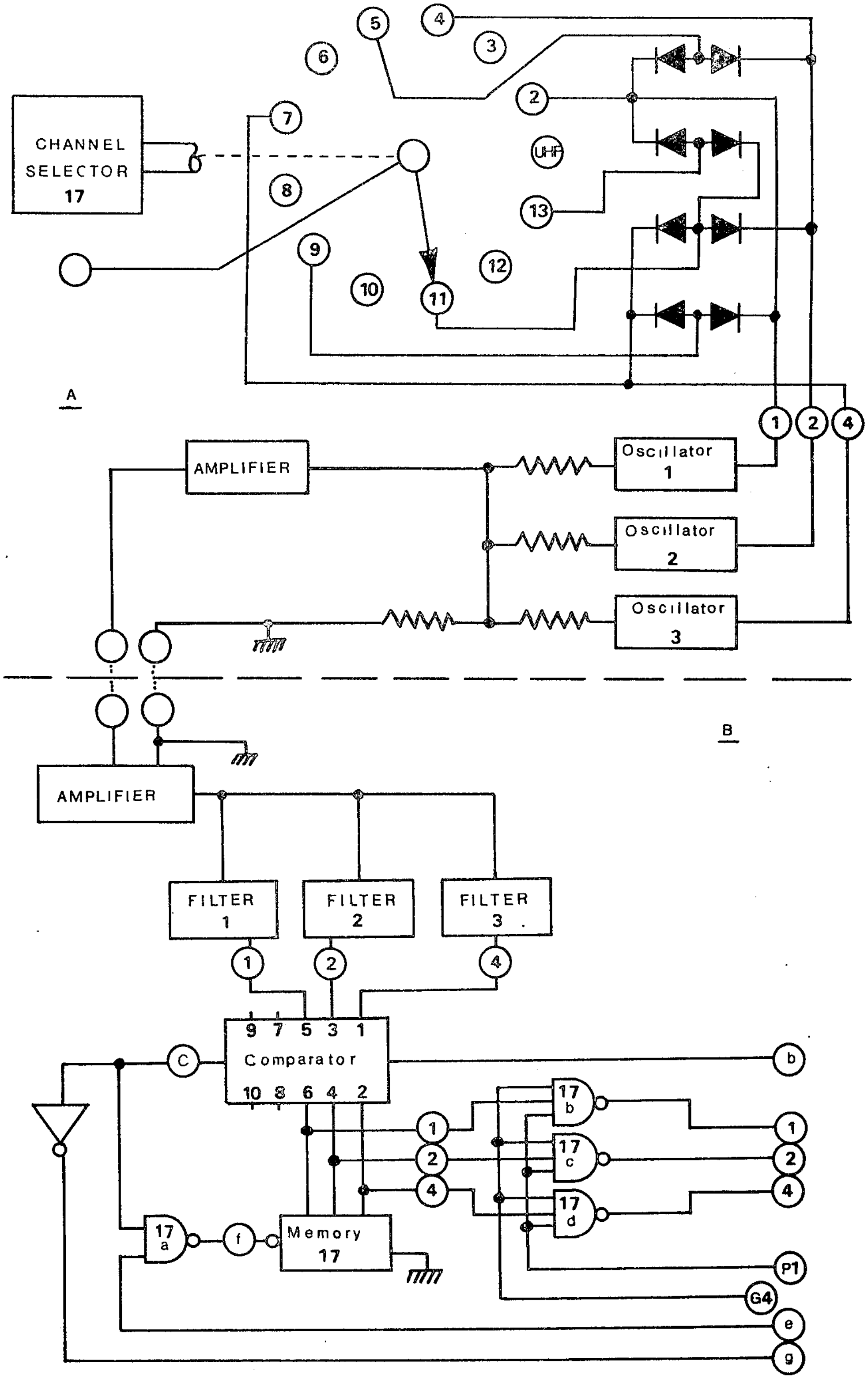
FIG. 5 shows the schematic diagram of an adapted television receiver and its corresponding part at the central control and recording unit, for the second practical execution of this invention.

In FIG. 5 we see in the upper part marked A, the circuit adapted to the sampled residence; we have taken for this example the residence number 17 where the channel 11 is being received. We have an identical codifier as utilized in the first application plus a transmitter which is composed of three audio oscillators and an amplifier which injects into the private line number 17 the coded combination of the three audio frequencies which represent the channel being tuned in; in this case we shall have the frequencies of oscillators 3 and 2 since the channel 11 is coded as 110.

In the lower or B part of FIG. 5 we see the circuit of the receiver number 17 which contains an amplifier, three detecting filters, a comparator, a memory and the output gates which are commanded by the word and group pulses of the selector-switch.

Since, in this example, we are controlling forty residences, the same number of receivers as mentioned in the preceding paragraph are needed.

Figure 6:
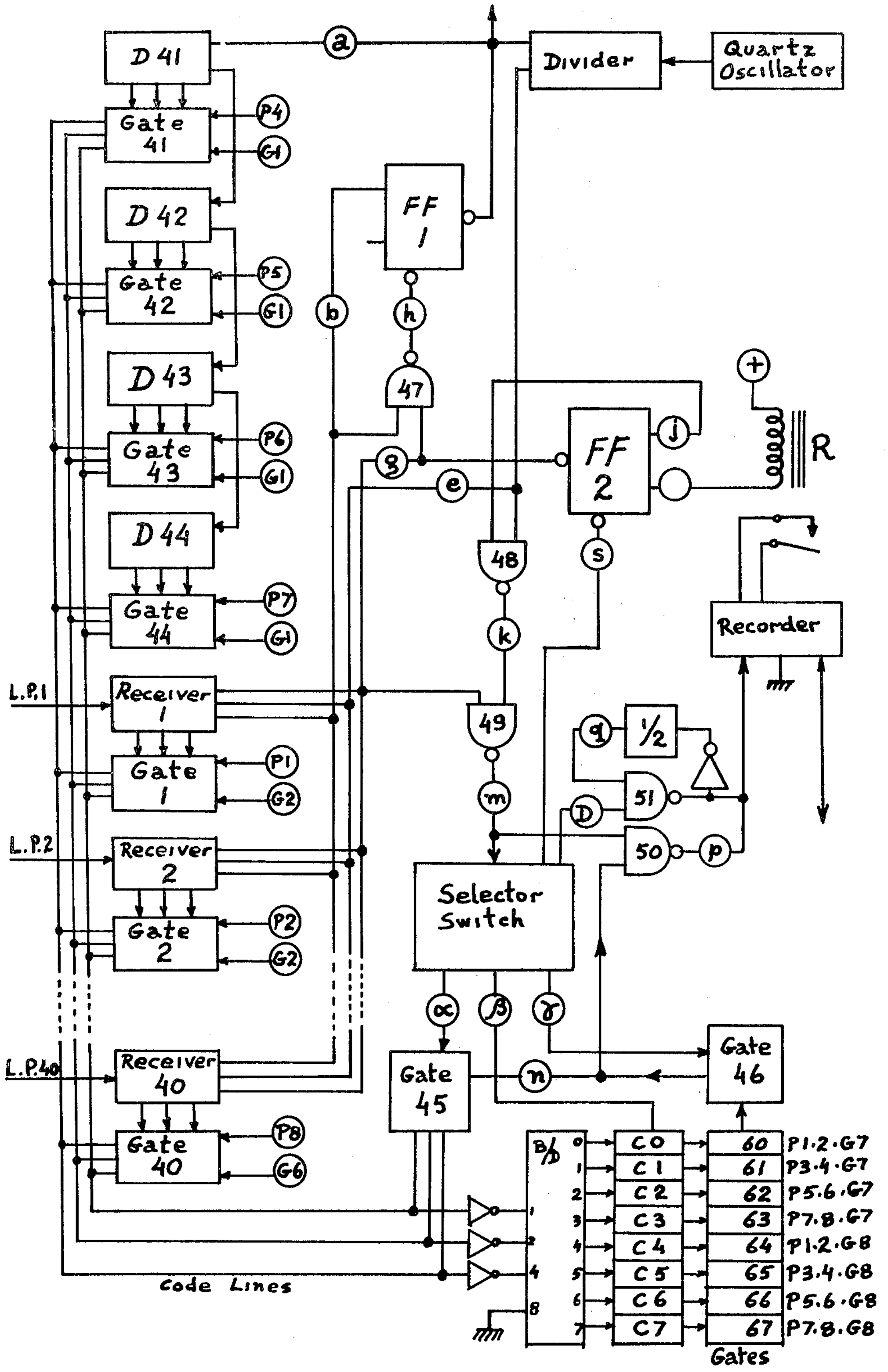
FIG. 6 shows the various receiving units and respective gates at the central control and recording unit, with their interconnection.

In FIG. 6 the circuit of the central unit is shown. The centralization permits the utilization of only one central clock, which through appropriate dividers the same sampling pulse is furnished to all the 40 residences (L.P.1. . . . .L.P.40) being sampled. This central clock could be of high precision (quartz oscillator) from where also the *e* pulses could be derived for the updating of the memories and feeding the selector-switch.

The *a* pulses are counted in dividers D41 up to D44, with a capacity of 4,096 pulses which are more than sufficient for the daily control which is to be made.

The operation is similar to that of the first application, previously described: at every sampling pulse *a* the flip-flop FF1 is inverted making *b* go H activating all the forty comparators; if all the coded signals being received are equal to the ones stored in the respective memories, then the common *g* point remains H forcing a L signal *h* to appear at the output of gate 47 which resets the FF1. No recording has been made and only another sampling pulse has been counted. If, however, at least in one of the comparators a difference is found between the received code and the one stored in its respective memory, then the common *g* point goes L inverting the flip-flop FF2, the recorder is turned on, the memory is up-dated to the new code and the recording cycle is started.

Figure 7:
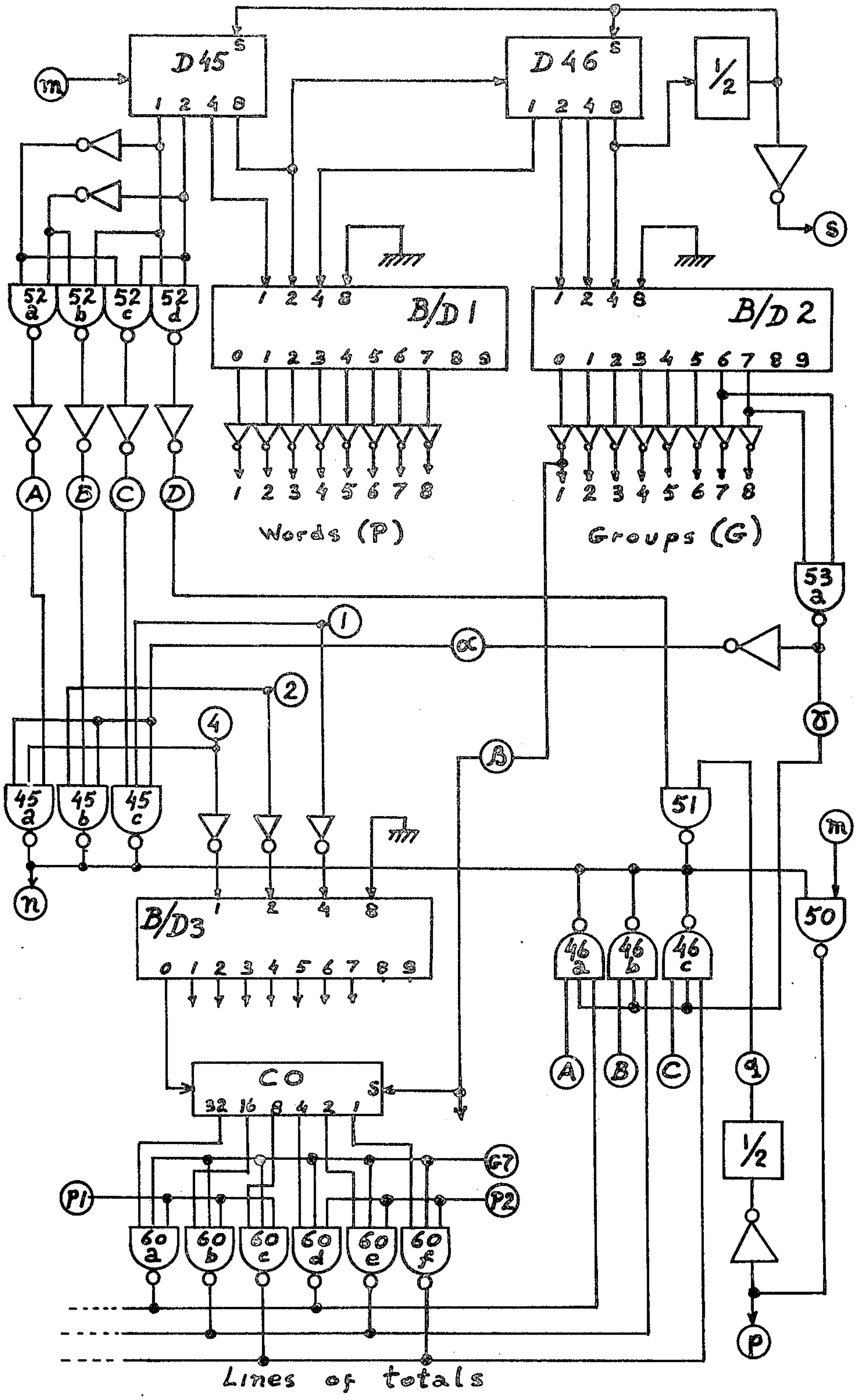
FIG. 7 shows the schematic circuit diagram of the selector switch, the parity generator and one of the totalizing counters.

In FIG. 7 the circuit of the selector-switch utilized in this particular application is shown; the *m* pulses are divided in D45 and D46, from gate 52 the sequential bit pulses A, B, C and D are formed, from the binary/decimal converter B/D1 the word pulses 1 through 6 (with the duration of four bit pulses) are formed, and from the binary/decimal converter B/D2 the group pulses 1 through 8 (with the duration of eight word pulses) are formed.

The combination of the above command pulses at the various gates is so chosen that the complete recorded signal contains 8 groups of 8 words of 4 bits each, as shown in FIG. 8. The first group contains the time information, groups 2 through 6 contain the coded information regarding the forty sampled residences, and groups 7 and 8 contain the contents of the counters CO through C7.

This selector-switch permits the sequential transfer of the various dividers to the three common code lines which feed gates 45 and through inverters the binary/decimal converter B/D3 whose output feeds the counters CO through C7. The gates 45 are open during the period when *ac* is H, which occurs for the six first groups; during this time we obtain at *n* the sequential H or L pulses corresponding to the contents stored in dividers D41 through D44 and D1 through D40. After the contents of the last divider D40 have been read, we will have in the counters C1 through C7 totalized the number of residences which were tuned in for each of the seven channels, and in counter C0 the number of residences which had their television receivers off. These totalizing counters are connected to the total lines by the gates 60 and following which are also commanded by the selector-switch. The total lines are in turn connected to the *n* point by the gates 46. The totalizing counters are zeroed during the first group of words, starting their respective counts with the second group of words; the gates 46 open for the seventh and eighth group of words when the gates 45 close.

Similarly to the circuit of the first application the *n* signal is added to *m* pulses in gate 50 forming the *p* pulses for the recording proper; *p* is also inverted and divided by two to form the even parity pulses *q*, which is, in this execution, used always as the fourth bit of each of the 64 words, by commanding the passage of the D pulse through gate 51 to the *n* point.

Every day, in the morning, the recording containing all the data of the previous 24 hours can be removed for processing.

This centralization permits the interconnection of various of these control and recording units, with further economies since the logic circuit and the commanding pulses may be common to all the units.

This centralization permits further the connection of an electric printer, which would permit the direct printing of the tabulated data with the viewing habits of the sampled residences, with the direct indication (by means of the totalizing counters) of the audience penetration of each television station. The immediately available penetration of the programs being transmitted could be fed back to the program directors (by means of teletype or any other such means).

The centralization, by producing the direct print-out of the tabulated data, eliminates the necessity of the utilization of digital computers for analyzing and preparing the data in a tabulated form.

It should be clear that the examples described above are not limiting other varied executions of this invention. The basic principle of periodic sampling and the registering of the values of variables, according to the system of this invention can easily be applied in the fields of medicine, industry, commerce, weather forecasting, or any other, with the appropriate use of the necessary transducers and adaptations in the circuitry.

While in the foregoing specification two preferred embodiments of the invention have been set down for the purpose of explanation, many variations in the details herein given may be made by those skilled in the art without departing from the spirit and scope of the appended claims.

I claim:

1. An electronic system for the analysis of television audience ratings by monitoring and processing into a recorder the code pulse signals received from the channel selector switch of a television set, said processing into the recorder being in the form of units of words of an even number of pulses each, said system comprising:

a television receiver set having a channel selector switch, a generator of code pulses connected to the channel selector switch for supplying code pulses indicative of the station received, a receiver connected by transmission means to said generator of the code pulses from the station received, a memory for storing the code pulses of the station received, a comparator connected to said receiver for receiving the code pulses and for distinguishing them from the code pulses previously stored in the memory, a logic circuit connected to the memory and to the comparator, a selector switch connected to the logic circuitry, a recorder connected to the logic circuit and to the selector switch, a source of timing and control means providing timing and control pulses to the memory, comparator logic circuit, selector switch and recorder, a parity pulse generating circuit connected to the output of pulses from the selector switch and consisting of an inverter of said pulses and of a divider of the inverted pulses to provide an additional pulse which is added to output of the selector switch to insure that each word recorded always contains an even number of pulses, said recorder being activated by pulses from the comparator when the newly received code pulses at the comparator differ from the code pulses previously stored in the memory.

* * * * *